US007212101B2

(12) United States Patent
Lohr

(10) Patent No.: US 7,212,101 B2
(45) Date of Patent: *May 1, 2007

(54) DEVICE FOR BROADBAND ELECTRICAL SIGNAL AND/OR ENERGY TRANSMISSION USING A TRANSMISSION SYSTEM INCLUDING COUPLERS

(75) Inventor: Georg Lohr, Eichenau (DE)

(73) Assignee: Schleifring und Apparatebau GmbH, Fuerstenfeldbruck (DE)

( * ) Notice: Subject to any disclaimer, the term of this patent is extended or adjusted under 35 U.S.C. 154(b) by 108 days.

This patent is subject to a terminal disclaimer.

(21) Appl. No.: 10/287,159

(22) Filed: Nov. 4, 2002

(65) Prior Publication Data

US 2003/0132815 A1 Jul. 17, 2003

Related U.S. Application Data

(63) Continuation of application No. PCT/DE01/01717, filed on May 7, 2001.

(30) Foreign Application Priority Data

May 5, 2000 (DE) ................................ 100 21 670

(51) Int. Cl.
*G05B 11/01* (2006.01)

(52) U.S. Cl. ............ 340/310.17; 333/109; 340/310.16; 378/4

(58) Field of Classification Search ................ 340/500, 340/310.11, 310.16, 310.17; 378/4, 15; 333/24 R, 333/109, 111, 32, 1; 359/144; 455/41.1, 455/127.2, 127.1, 69, 41; 375/257; 326/86
See application file for complete search history.

(56) References Cited

U.S. PATENT DOCUMENTS

| | | | | |
|---|---|---|---|---|
| 4,358,746 | A | 11/1982 | Miller et al. | 333/261 |
| 4,730,224 | A * | 3/1988 | Komatsu | 360/64 |
| 4,940,954 | A * | 7/1990 | Aubert et al. | 332/103 |
| 5,140,696 | A * | 8/1992 | Fox | 455/41.1 |
| 5,192,923 | A * | 3/1993 | Komatsu | 333/116 |
| 5,208,581 | A * | 5/1993 | Collins | 340/671 |
| 5,530,422 | A * | 6/1996 | Harrison | 340/500 |
| 5,535,033 | A * | 7/1996 | Guempelein et al. | 398/114 |
| 5,600,697 | A * | 2/1997 | Harrison | 378/15 |
| 5,734,658 | A * | 3/1998 | Rall et al. | 370/438 |
| 5,737,356 | A * | 4/1998 | Harrison et al. | 375/130 |
| 5,892,411 | A * | 4/1999 | Schwan et al. | 333/24 R |

(Continued)

FOREIGN PATENT DOCUMENTS

DE 197 00 110 7/1998

(Continued)

*Primary Examiner*—Brent A. Swarthout
(74) *Attorney, Agent, or Firm*—Kevin L. Daffer; Daffer McDaniel, LLP

(57) ABSTRACT

An arrangement for broadband signal and/or energy transmission, between at least two units is disclosed. Said units may be displaced relative to each other along a track. Said arrangement comprises a first unit, which has a symmetrical open circuit arrangement with at least one reflection-free closed end, within which an electromagnetic wave can propagate and at least one second unit with a coupling unit for the coupling and/or decoupling of electrical signals. The invention is characterized in that at least one of the at least one second units has a directional coupler for the coupling and/or decoupling of signals.

17 Claims, 5 Drawing Sheets

U.S. PATENT DOCUMENTS 6,292,014 B1 * 9/2001 Hedberg ...................... 326/30
6,307,402 B1 * 10/2001 Hedberg ...................... 326/86
6,437,656 B1 * 8/2002 Guynn et al. ............. 333/24 R
6,825,737 B2 * 11/2004 Lohr ........................ 333/24 R
6,838,958 B2 * 1/2005 Lonsdale et al. ........... 333/261
6,956,450 B1 * 10/2005 Lohr .......................... 333/261

FOREIGN PATENT DOCUMENTS

JP 61105903 5/1986
JP 62183601 8/1987
WO 97/19483 5/1997

* cited by examiner

DEVICE FOR BROADBAND ELECTRICAL SIGNAL AND/OR ENERGY TRANSMISSION USING A TRANSMISSION SYSTEM INCLUDING COUPLERS

This application is a continuation of pending International Patent Application No. PCT/DE01/01717 filed May 7, 2001, which designates the United States and claims priority of pending German Application No.10021670.6 filed May 5, 2000.

FIELD OF THE INVENTION

The present invention relates to a device for transmitting electrical signals or energy, respectively, between several units mobile relative to each other.

For the sake of a clear description, the present patent document does not discriminate between the transmission of units mobile relative to each other and a stationary unit with units mobile relative to it because this is only a question of local reference and does not take any influence on the mode of operation of the invention. Moreover, a more detailed distinction between the transmission of signals and energy is not made as the mechanisms of operation are the same in this respect. Furthermore, the term “trajectory” relates to the extension of the path of a movement. It may hence correspond to a straight line, a circle or any other curve.

BACKGROUND OF THE INVENTION

With units mobile along a linear path, such as hoisting and conveying installations and also in the case of rotatable units such as radar installations or even computer tomographs, it is necessary to transmit electrical signals or energy between units mobile relative to each other. For the transmission of signals both contacting and non-contacting methods are known. The U.S. Pat. No. 5,208,581 discloses a method that permits the transmission of signals in a contacting manner, using a closed conductor. This method displays two decisive disadvantages. On the one hand, it is applicable only for closed arrangements in rotational symmetry and hence does not provide a solution for linear transmission systems such as those required for crane installations. On the other hand, this system displays very poor high-frequency properties in the event of signal feed from a mobile unit into the signal paths. The problem here resides in the aspect that a termination must be coupled at a position diametrically opposite to the feeding site via a second sliding-contact arrangement. The signal transmission operates perfectly only when both the feed coupler and the termination are appropriately coupled. In practical operation, this can be achieved only with very great difficulties when the usual sliding-contact arrangements such as gold spring wire or silver graphite carbons are used. The reason for this resides in the aspect that such contact systems have a contact resistance that may have a broadband noise character over a bandwidth of up to several mega Hertz. When now a series circuit (feeding site and termination) of two of such contact systems is required for a perfect function of the transmission system a low-noise transmission can be realised only with a very high expenditure. In this respect, non-contacting transmission techniques entail advantages, such as those described in the U.S. Pat. No. 5,530,422 and in the German patent specification DE 197 00 110. The first one of these transmission techniques uses a strip line for transmission whilst the second one of these transmission techniques operates on a conductor structure composed of a plurality of discrete dummy elements. This offers the advantages of very high noise suppression. In distinction from the conductor system mentioned first, both conductor systems are connected by their ends to form a closed ring. They are open and may hence be matched with any trajectory whatsoever. A respective termination element is provided on both ends of these conductor structures to form a reflection-free termination. The signals are fed invariably at a suitable site into the conductor structure. Hence, the signals are always transmitted from the conductor structure to a unit disposed for movement relative to the conductor structure. This systems presents, however, serious disadvantages in various applications. When, for instance, in the case of a linear transmission the signal transmission from mobile crane installations to a stationary unit is desired an antenna element must be mounted on that mobile crane installation, which element covers the entire length of the displacement path. This means that an antenna carrier of 50 m in length, for example, must be mounted at the bottom of the crane installation. In other fields of application, e.g. in computer tomographs, the conductor structure is applied on a mechanical slip ring that rotates together with the rotating part. Hence, data transmission from the rotating part to the stationary part is possible without any problems whilst a transmission in the opposite direction requires an additional ring for receiving a stationary conductor structure. Specifically in the field of computer tomographs, this cannot be realised for reasons of costs. The term “conductor structure” will be used in the following as a generic term encompassing structures in which electromagnetic waves can propagate, e.g. arrangements composed of dummy elements, strip lines or other conductor systems.

BRIEF DESCRIPTION OF THE INVENTION

In accordance with the claims set forth herein, the present invention is based on the problem of providing a device for non-contacting transmission of electrical signals, which permits the transmission from a mobile unit to the conductor structure or the simultaneous transmission of signals in both directions.

This problem is solved by using the means defined in the claims. For the signal transmission between two parts mobile relative to each other and disposed along any trajectory whatsoever, a symmetrical conductor structure is used which is operated on a differential signal and which is terminated in a reflection-free manner on at least one end. This conductor structure may be any arrangement whatsoever for conducting electromagnetic waves such as arrangements composed of dummy elements or strip lines. At least one of the two parts mobile relative to each other comprises at least one directional coupler for coupling and decoupling signals.

A particularly expedient embodiment of the arrangement is so designed that signals may be transmitted in both directions. The signal transmission direction from the conductor structure to an element mobile relative to the structure will be referred to as first transmission direction whilst the opposite direction will be referred to as the second transmission direction. The signal transmission in the first direction takes place on principle by feeding the transmission signal at an invariably predetermined site into the conductor structure. In the event of rotatable arrangements it is sensible to dispose the feeding site in the centre of the conductor structure, i.e. at the site that is equidistant from both ends. Hence, the delay times of the signal running to both ends of the conductor structure are of the same length and correspondingly the phase shift is zero. This results in a continuous phase development without discontinuities in the passage over the ends of the conductors. The signal transmission in the second direction takes place in the aforedescribed manner from the mobile unit to the conductor structure.

In a particularly simple embodiment of the arrangement, the receiver of the second direction can be mounted on the conductor structure on the same coupling site as the transmitter for the first direction. As a matter of fact, with this type of configuration, however, only a half-duplex operation is possible, which means that data can be transmitted in one of the two directions only by the same point of time.

Another expedient embodiment of the invention consists in the provision that directional couplers are used to separate the signals of the first and the second data transmission means from each other. As a result, the simultaneous transmission is possible in both directions (full duplex operation).

In a further expedient embodiment of the invention, at least one of the two signals is modulated additionally onto a carrier for the first or the second direction. When this carrier is selected beyond the transmission range of the respectively other signal a simple separation of the two signals is also possible in duplex operation.

According to another embodiment of the arrangement, at least one directional coupler is integrated into the substrate of the conductor structure for decoupling the signals in a directionally selective manner.

A further embodiment of the invention provides for at least one directional coupler for directional separation of the signals into the feeder line leading to the coupling site of the conductor structure.

According to a further embodiment of the invention, the signals are coupled into and out from the conductor structure by units mobile relative to the structure. Hence, signal transmission is possible between units moving at different relative speeds.

Another embodiment provides for an additional fixed coupling of signals on the conductor structure.

According to a further expedient embodiment of the invention, at least one coupler unit mobile relative to the conductor structure is realised as directional coupler. Hence, signals can be coupled in and out as a function of the direction. This permits a better separation of transmitted and received signals.

In another expedient embodiment of the invention, a respective receiver is undetachably connected on both ends of the conductor structure. Additionally, at least two mobile transmitter units are provided which are designed as directional couplers. These transmitter units are so disposed that the first transmitter unit transmits the signals in a direction towards the first receiver associated with it. The second transmitter unit is so arranged that it will transmit its signals in the opposite direction towards the receiver associated with it.

In a further advantageous embodiment of the invention, a transmitter for the first signal transmission direction as well as a receiver for the second signal transmission direction are coupled on at least one end of the conductor structure by means of a directional coupler. This directional coupler may be designed to comprise conducting elements or even discrete components in correspondence with prior art. A receiver element designed as directional coupler is provided for receiving the signals from the first transmission direction. The transmitted signals are transmitted or coupled into the second transmission direction via a second coupler unit mobile relative to the conductor structure. In order to avoid over-coupling of the signals from the mobile transmitter to the mobile receiver it is necessary that the transmitter is located on that side of the receiver, which is turned away from the transmitter associated with the first signal transmission direction.

In another expedient embodiment of the invention at least one respective transmitter or receiver is coupled fixedly to the conductor structure via directional couplers, and a mobile transmitter is provided, which is provided with a coupling element designed as directional coupler. The mobile receiver unit may be designed here without any directional selection when it is located on that side of the mobile transmitter, which is turned away from that end of the conductor structure, which is connected to the receiver of the second signal transmission direction.

In a further expedient embodiment of the invention, the mobile coupler elements for the mobile transmitter and for the mobile receiver are designed as directional couplers in the case of a fixed contact with the conductor structure with a transmitter and a receiver via directional couplers.

BRIEF DESCRIPTION OF THE DRAWINGS

In the following, the invention will be described, in an exemplary manner without any restriction of the general inventive idea, by the example of embodiments, referring to the drawing to which explicit reference is made in all other respects as far as the disclosure of all inventive particulars is concerned which are not explained in more details in the text. In the drawing:

FIG. 13 is a view of an arrangement optimised for a closed trajectory;

DETAILED DESCRIPTION OF THE DRAWINGS

Figure 1:
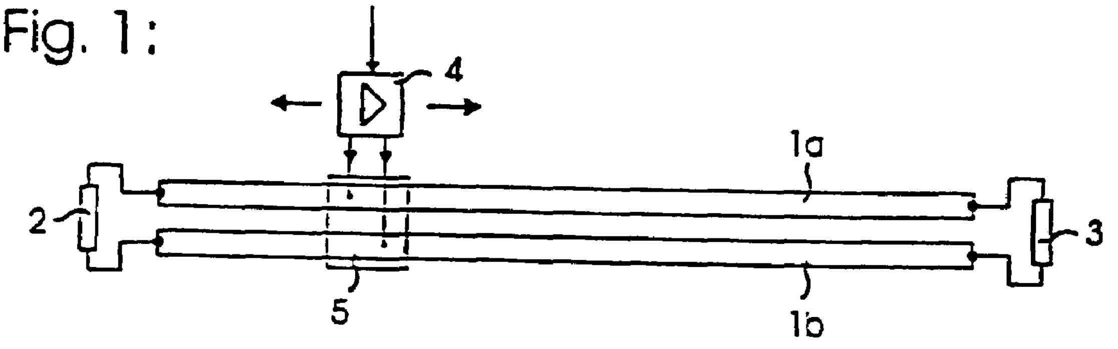
FIG. 1 illustrates an exemplary embodiment of the invention.

FIG. 1 illustrates an example of a specific embodiment of the invention.

A conductor structure consisting of the two symmetrically disposed conductors (1*a*) and (1*b*) is terminated on both ends with the terminations (2) and (3) in a reflection-free manner. A symmetrical signal generated by the driver stage (4) is coupled into this structure via the coupling element (5). This coupling element is designed as directional coupler.

Figure 2:
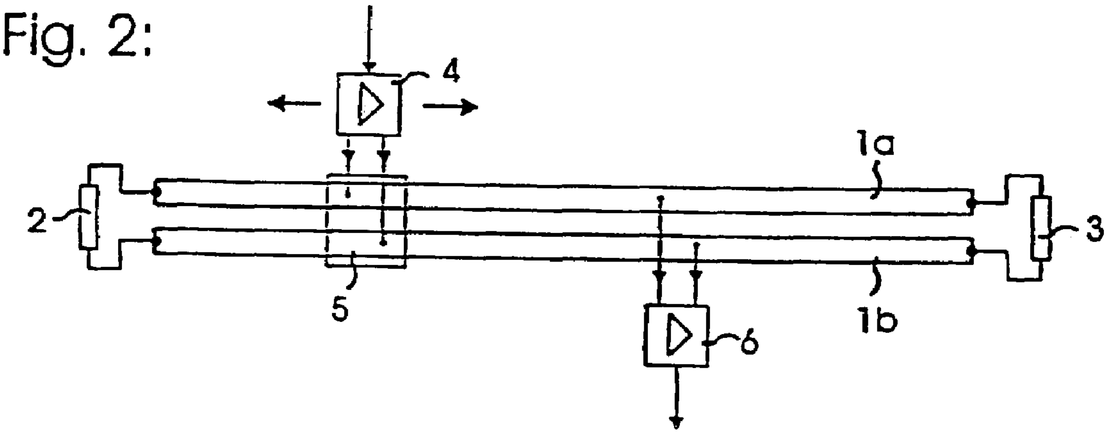
FIG. 2 shows an arrangement with an additional fixed decoupling unit.

FIG. 2 illustrates one embodiment of the invention, which comprises an additional receiver element.

The reception of the fed signals is realised here via a receiving element (6) that is fixedly contacted with the conductor structure.

Figure 3:
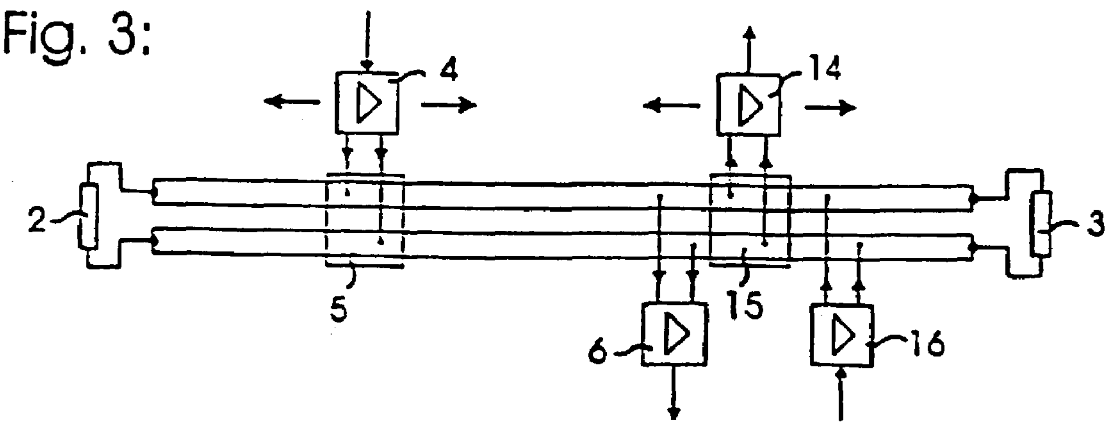
FIG. 3 is a view of an arrangement with different units for coupling and decoupling.

FIG. 3 is the illustration of a particularly flexible embodiment of the invention. Here, a still further receiving element (14) with an associated coupling element (15) is provided in addition to the aforedescribed components, which can be moved optionally together with or independently of the first driver stage relative to the conductor structure. This coupling element may also be designed as directional coupler. As a result, a communication is possible between both moved units. Moreover, an optional number of the mobile units may be provided.

Furthermore, an additional exemplary driver stage (16) is provided that is fixedly connected to the conductor structure.

The arrangement shown here is fundamentally suitable for functional operation even without the two fixedly installed units (6) and (16).

Figure 4:
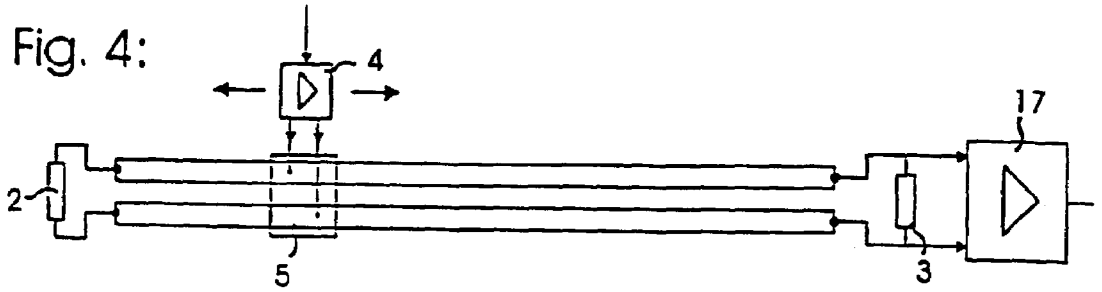
FIG. 4 illustrates an arrangement with a fixedly connected decoupling unit.

FIG. 4 is an exemplary illustration of an inventive arrangement including a receiving unit (17) fixedly connected to the conductor structure, with its input impedance cooperating with the terminating impedance (3) to ensure a reflection-free termination of the conductor structure.

Figure 5:
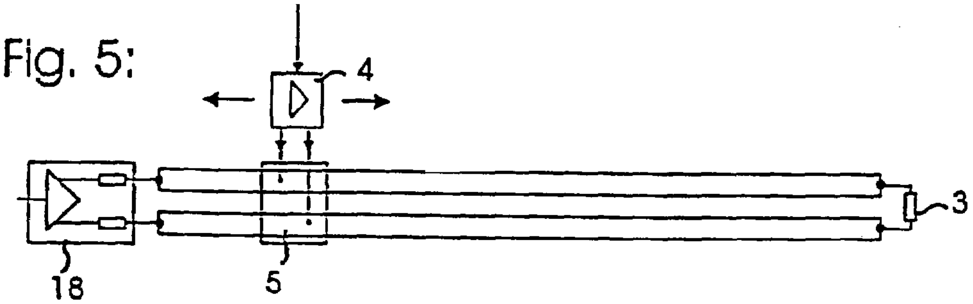
FIG. 5 shows an arrangement including a fixedly connected coupling unit.

FIG. 5 shows an exemplary view of an inventive arrangement comprising a transmitter unit (18) fixedly connected to the conductor structure, with its output impedance ensuring a reflection-free termination of the conductor structure. It is expedient on principle to terminate also that end of the conductor structure in a reflection-free manner, which is used for stationary coupling. There are, however, also applications where a reflection may be tolerated on this end. In such cases a low-resistance feed is advantageous on account of the higher signal amplitude that can be achieved with this design.

Figure 6:
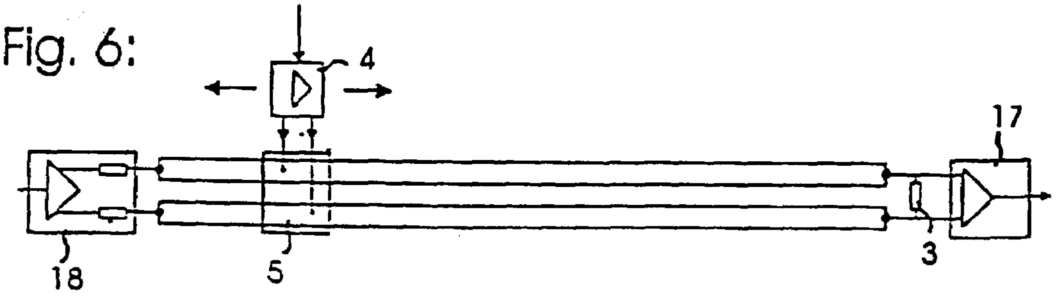
FIG. 6 shows an arrangement with a fixedly connected unit for coupling and decoupling.

FIG. 6 is an exemplary view of an inventive arrangement comprising a receiving unit (17) fixedly connected to the conductor structure and a transmitter unit (18) fixedly connected to the conductor structure.

Figure 7:
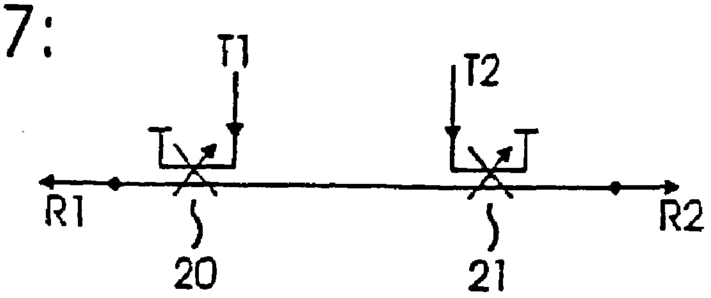
FIG. 7 illustrates an arrangement for the simultaneous transmission of two signals from the moved unit to the stationary unit.

FIG. 7 is a view illustrating the simultaneous transmission of two channels. Here, a receiving means is disposed on each end of the conductor structure. The signals are coupled from the mobile units into the structure via coupling elements designed as directional couplers (20), (21). The coupling direction of both directional couplers (20), (21) is oriented in opposite directions towards the respective associated receivers. The transmitter for the first transmission direction is identified as T1 whilst the reference numeral R1 denotes the associated receiver. The elements of the second transmission direction are identified as T2 and R2.

For the sake of simplicity the symmetrically designed conductor structures (1) are illustrated as plain lines in this view and in the following figures. They are realised as symmetrical components for those cases where the coupling elements for signal coupling and decoupling are designed as directional couplers. When directional couplers are coupled via lines to the conductor structure or coupling elements are designed they may be optionally designed in a symmetrical or non-symmetrical form. A non-symmetrical structure is sensible when the directional coupler is coupled via a symmetrization element such as a balanced/unbalanced transformer to the symmetrically structured conductor structure.

Figure 8:
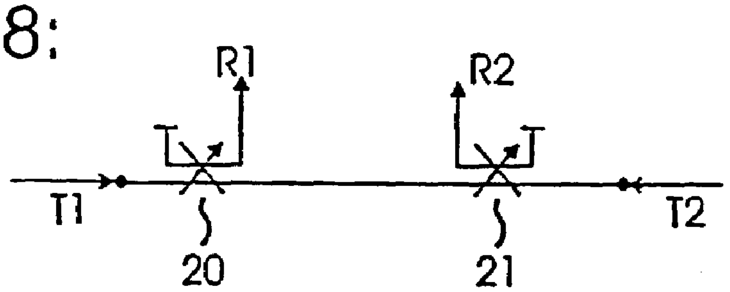
FIG. 8 is the view of an arrangement for the simultaneous transmission of two signals from the stationary unit to the moved units.

FIG. 8 illustrates a similar arrangement with the inverted data transmission means. Here, transmitters (T1), (T2) are disposed on both ends of the conductor structure. The associated receivers (R1), (R2) are disposed for movement via coupling elements designed as directional couplers (20), (21). Here, the coupling directions of the two directional couplers are opposite so that each receiver will exclusively receive the signals from the transmitter associated with it.

Figure 9:
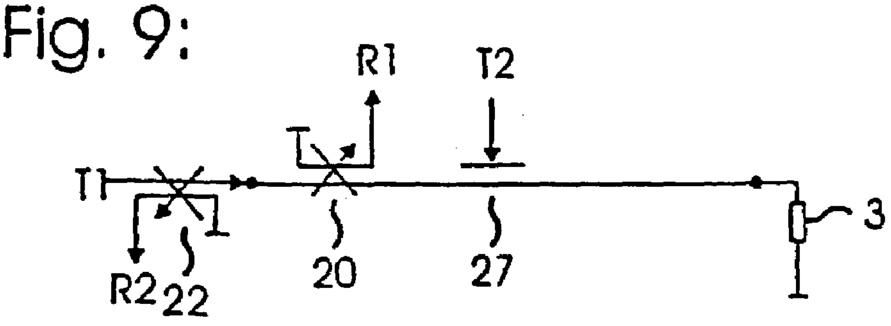
FIG. 9 shows an arrangement for the directionally selective signal decoupling and the directionally selective signal coupling of the moved unit.

FIG. 9 illustrates an arrangement in which a transmitter (T1) as well as a receiver (R2) are coupled via directional couplers on one end of the conductor structure. In this embodiment, the transmitter (T1) for the first transmission direction feeds the signal into the conductor structure whereas the directional coupler (22) selectively passes the signal arriving from the conductor structure to the receiver (R2) of the second transmission direction. A directional coupler (20) is provided as decoupling element for the first transmission direction, which transmits the signals selectively from the direction of the associated transmitter (T1) to the receiver (R2). A transmitter (T2) is provided on a second mobile unit that may be fixedly connected to the first mobile unit, which transmitter transmits its signals by means of a directionally selective coupling element (27) into the conductor structure. The signal of this transmitter now propagates in both directions in the conductor structure. In this step it is supplied, on the one hand, via the directional coupler connected to the conductor structure to the receiver (R2) of the second signal direction, and on the other hand, the second wave propagating in the opposite direction is absorbed by the reflection-free termination (3) of the conductor structure.

Figure 10:
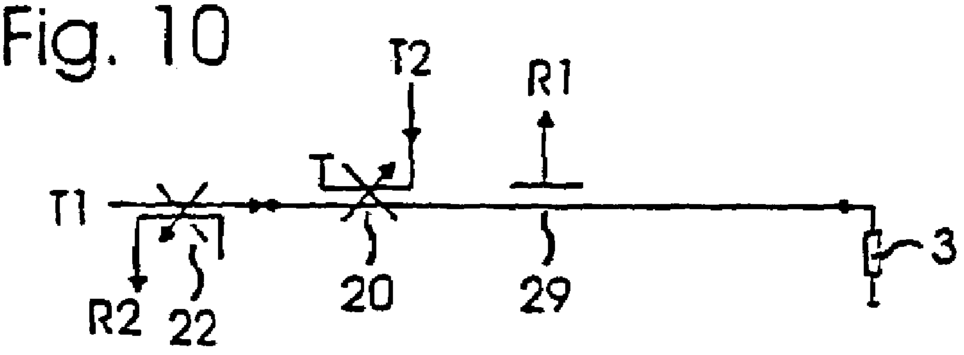
FIG. 10 is a view of an arrangement for directionally selective decoupling signals from and for directionally selective coupling signals into the moved unit.

FIG. 10 illustrates an arrangement where, compared against the previously described arrangement, the directionally selective elements are exchanged. Here, the transmitter (T2) of the second transmission direction is now coupled via a directional coupler (20) to the conductor structure. The mobile receiver is coupled to the conductor structure via a directionally selective coupling element. In this arrangement, a directional selectivity in the mobile receiver is not required because the signal of the mobile transmitter (T2) is exclusively transmitted in the direction towards the receiver (R1) that is fixedly connected to the conductor structure.

Figure 11:
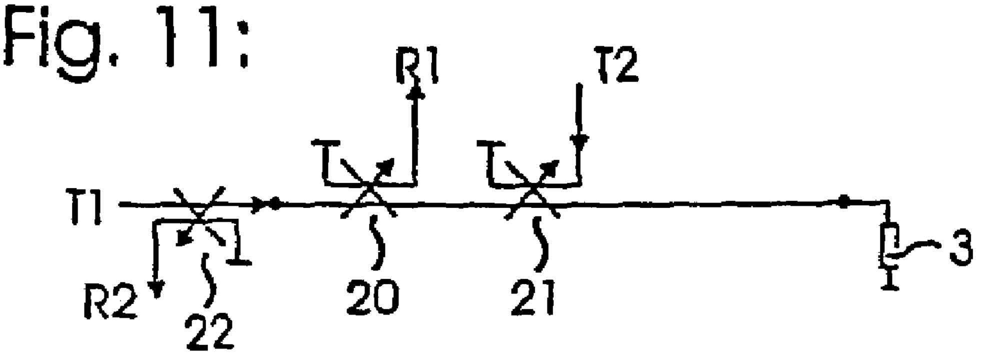
FIG. 11 shows the arrangement for directionally selective signal coupling and directionally selective decoupling of signals of the moved unit.

FIG. 11 illustrates a further arrangement where directional couplers are employed for signal coupling and decoupling of the mobile units. Compared against the two previously described arrangements, this arrangement presents the advantage that decoupling between the mobile transmitter and the mobile receiver is substantially higher.

Figure 12:
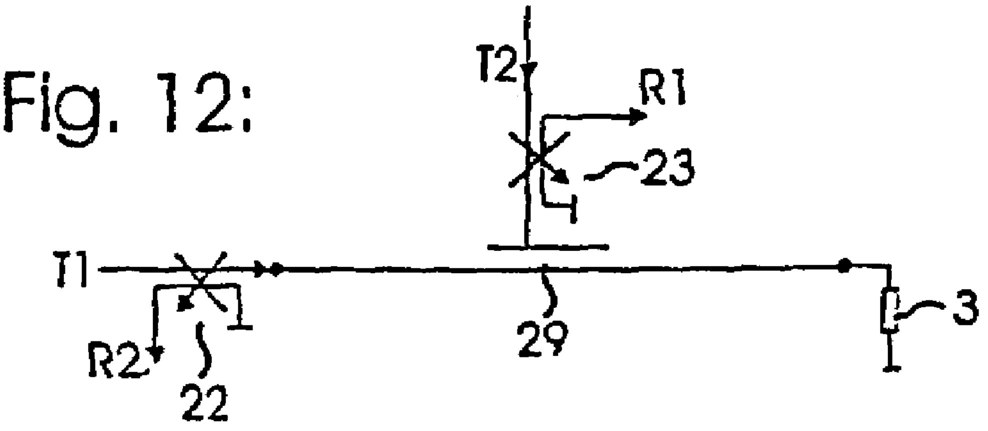
FIG. 12 illustrates an arrangement for directionally selective signal coupling and decoupling of the moved unit via directionally selective coupling elements.

FIG. 12 is a view of an arrangement where the transmitter (T1) for the first transmission direction as well as the receiver (R2) for the second transmission direction are fixedly connected to the conductor structure by means of a directional coupler (22). Moreover, a mobile combined transmitter and receiver unit is provided in which the signals from the transmitter (T2) and the receiver (R1) are equally separated via directional couplers (23). A directionally selective coupling element (29) is used for signal coupling and decoupling.

FIG. 13 illustrates an arrangement of the type preferably employed for rotational transmission or at least with closed trajectories. Here, the transmitter for the first signal transmission direction (T1) as well as the receiver (R2) for the second signal transmission direction are coupled, for instance, by means of a directional coupler (26) approximately in the middle of the conductor structure. On principle, coupling may be carried out at any point whatsoever in the conductor structure. When the two ends of the conductor structure are, however, disposed close to each other the signal phases of the signals should be equal, if possible, at the ends. This can be achieved by the equal signal delay time of both signals and hence with equal conductor lengths. The unit mobile relative to this conductor structure is so designed that it can transmit or receive data from any position of the conductor structure. The transmission of the data (T2) from the mobile unit is carried out with the directionally selective coupling element (27). The signals are received (R1) as a function of the position of the fixed coupling unit relative to the mobile coupling unit, optionally via one of the two directional couplers (24) or (25). In the illustrated case, for example, the signal (T1) is coupled into the conductor structure and decoupled via the directional coupler (25) to the receiver (R1). The directional coupler (24) can here decouple only a negligible signal fraction on account of the wrong direction. The two directional couplers are combined in the combining unit (28) optionally via an adder or also via a changeover switch that may be controlled, for instance, by a position encoder.

Figure 14:
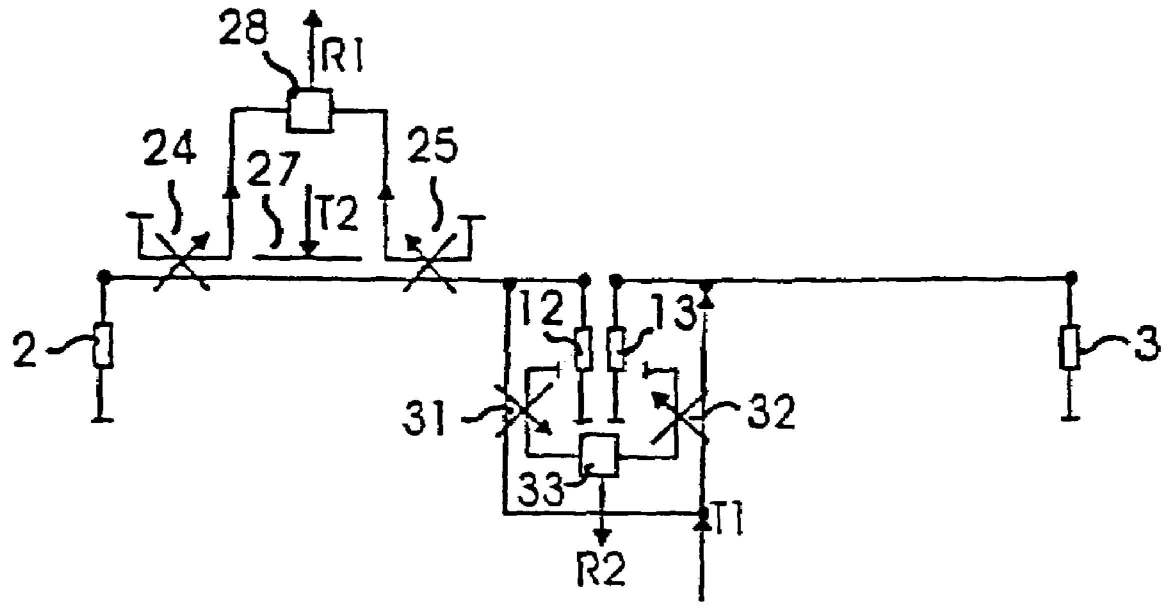
FIG. 14 illustrates a further arrangement optimised for a closed trajectory.

FIG. 14 shows an enhanced design of the arrangement shown in FIG. 13. When in the arrangement of FIG. 13 the coupling element (27) is located directly above the stationary coupling site of the transmitted signal (T1) or the received signal (R2), respectively, reception is not possible because the transmitted signal propagates via the conductor structure in the directions of the maximum coupling attenuation along the directional couplers (24) and (25). As a result, only a very small signal fraction can be decoupled. The arrangement illustrated in FIG. 14 provides a remedy in this respect. Here, the conductor structure is subdivided into two parts. Like the entire conductor structure described above, both parts are terminated in a reflection-free manner by the terminating impedance elements (2), (12) or (3), (13), respectively, on both ends. The stationary feeding sites are close to each other and spaced by a distance that is, however, at least as wide as one of the two directional couplers (24) or (25) used for mobile signal decoupling, plus the length of the coupling element (27). With this provision, it is ensured that at least one of the two directional couplers (24) or (25) receives a signal of the direction (T1) in the signal direction of low attenuation. For signal decoupling at the stationary sites, the two signals decoupled by the directional couplers (31) or (32) are combined with each other via a unit (33). This unit (33) may be designed as adder or also comprise a switch that switches between the two signals from the directional coupler (31) or (32) as a function of the position or the signal intensity.

Figure 15:
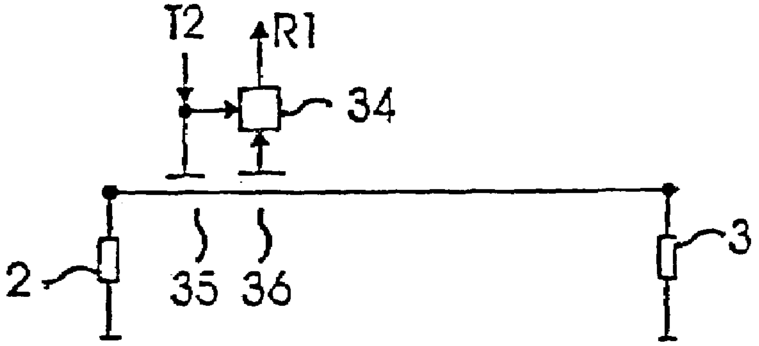
FIG. 15 shows the bi-directional transmission with directionally selective coupling elements.

FIG. 15 shows a particularly simple embodiment of the invention. For the sake of clear illustration, only the coupling means of one of the mobile elements is shown here. The signals are coupled or decoupled via two coupling elements independent of each other and separated in space if possible. The signal of the second transmission means (T2) is decoupled via the first one of these two coupling elements (35) into the conductor structure. The received signal is decoupled via the second coupling element (36) and passed on to the analyser unit (34). This analyser unit has the function to separate the received signal, which contains a sum of the signals of the transmitter (T1) of the first transmission means as well as of the transmitter (T2) of the second transmission means, by the transmission directions. In the simplest case, this happens by the subtraction of a certain fraction of the transmitted signal (T2), which corresponds approximately to the signal attenuation between the two coupling elements and the conductor structure. The difference is the received signal for the first direction (R1).

What is claimed is:

1. Arrangement for electrical broadband signal or energy transmission, comprising:

a first unit having two symmetrical electrical conductors operated on differential signals and having at least one end terminated in an essentially reflection-free manner, in which an electromagnetic wave can propagate; and at least one second unit having a coupling unit for coupling of electrical signals, and said at least one second unit does not contact with the conductors, but moves along a trajectory relative to said first unit, wherein at least one of said first or second units being provided with a directional coupler for signal coupling therebetween.

2. Arrangement according to claim 1, wherein at least one of said second units having a pair or mobile conductors for non-contacting inductive or capacitive signal coupling to said conductors.

3. Arrangement according to claim 1, wherein at least one receiver element connected to said conductors in a stationary manner is provided for receiving the signals.

4. Arrangement according to claim 1, wherein at least one receiving element is provided which is disposed for mobility relative to said conductors.

5. Arrangement according to claim 1, wherein at least one driver stage is provided, which is stationary relative to said conductors and which feeds signals into said conductors.

6. Arrangement according to claim 5, wherein the trajectory closes upon itself to form a circular trajectory, the feeding site of said driver stage is mounted at the pont in the midst of the conductor length.

7. Arrangement according to claim 5, wherein said driver stages or receiving elements, respectively, are coupled to said conductors by means of directional couplers for separating the transmitted or received signals, respectively.

8. Arrangement according to claim 1, wherein at least one directional coupler is integrated into said conductors for signal coupling or decoupling, respectively.

9. Arrangement according to claim 1, wherein at least one driver stage with a modulator for modulating the transmitted signals is provided and that at least one receiver element is provided with a corresponding demodulator.

10. Arrangement according to claim 1, wherein at least one coupling unit mobile relative to said conductors is designed as directional coupler for signal coupling or decoupling as a function of the direction.

11. Arrangement according to claim 1, wherein a receiver is fixedly connected to both ends of said conductors, and that furthermore a first mobile coupling unit designed as directional coupler is so arranged that it transmits signals predominantly in a direction towards the first receiver associated therewith, and that moreover at least one second coupling unit designed as directional coupler is so designed that it transmits its signals predominantly in the direction towards the second receiving unit associated therewith.

12. Arrangement according to claim 1, wherein a transmitter for the first data direction is coupled to one end of said conductor structure, as well as a receiver for the second data direction is coupled by means of a directional coupler, and that moreover a first decoupling unit designed for mobility, which is configured as directional coupler for receiving the data in said first data transmission direction, and that moreover at least one second mobile coupling unit is provided for coupling the signals in second signal transmission means.

13. Arrangement according to claim 1, wherein a transmitter for a first signal transmission direction as well as a receiver for a second signal transmission direction are coupled to at least one end of said conductors via directional couplers, and that a mobile coupling unit, which is connected to a transmitter for said second signal transmission direction, is designed as directional coupler, and that moreover a further mobile receiving unit is provied for said first signal transmission direction.

14. Arrangement according to claim 13, sherein said second mobile coupling unit for coupling the signals in said second data transmission direction is designed as directional coupler.

15. A system for electrical signal transmission, comprising:

a first part having two symmetrical electrical conductors operated on differential signals and having at least one end terminated in an essentially reflection-free manner;

a second part having at least one coupling unit for coupling of signals to or from said conductors; and said second part does not contact with the conductors, but moves along a linear trajectory relative to said first part, and wherein at least one of said first or second units provided with a first directional coupler that couples signals between said first and said second parts in only one direction.

16. The system according to claim 15 further comprising a second directional coupler that couples signal between said first and said second parts in only one direction.

17. The system according to claim 16 wherein the coupling direction of the second directional coupler is opposite of the coupling direction of the first directional coupler.

* * * * *

UNITED STATES PATENT AND TRADEMARK OFFICE

CERTIFICATE OF CORRECTION

PATENT NO. : 7,212,101 B2
APPLICATION NO. : 10/287159
DATED : May 1, 2007
INVENTOR(S) : Lohr It is certified that error appears in the above-identified patent and that said Letters Patent is hereby corrected as shown below:

IN THE CLAIMS

Col. 9, line 17: “sherein” and replace with --wherein--.

Signed and Sealed this

Fourteenth Day of August, 2007

JON W. DUDAS
*Director of the United States Patent and Trademark Office*